Dec. 29, 1931.  M. PÖNISCH  1,839,050

MACHINE FOR MAKING CREAM CARAMELS AND OTHER CARAMELS

Filed Oct. 2, 1930  2 Sheets-Sheet 1

Dec. 29, 1931.    M. PÖNISCH    1,839,050

MACHINE FOR MAKING CREAM CARAMELS AND OTHER CARAMELS

Filed Oct. 2, 1930    2 Sheets-Sheet 2

Inventor:
Max Pönisch

Patented Dec. 29, 1931

1,839,050

UNITED STATES PATENT OFFICE

MAX PÖNISCH, OF LEIPZIG, GERMANY

MACHINE FOR MAKING CREAM CARAMELS AND OTHER CARAMELS

Application filed October 2, 1930, Serial No. 485,882, and in Germany October 7, 1929.

A number of machines are known for making cream caramels and the like. The hot cream caramel mass is rolled into flat slabs in a machine equipped with a rolling cylinder. In a second machine these slabs are cut into square or rectangular sweets by means of one or two cylinders with circular knives. Machines are also on the market, in which rolling cylinders and cutting cylinders are combined in one machine. These methods take a considerable time and require a large number of operators. Moreover there is a great deal of waste from the edges of the slabs which has to be collected and again boiled up.

Continuously actuating machines are also known. Straight cutting knives are connected together in rows chain like and arranged shiftable in downward and upward directions. The cream mass is rolled into a continuous band by means of two cylinders and fed to a lower chain serving as support and to an upper chain serving as cutting chain. The upper chain is provided with movable knives, which move in downward direction and after the cut return into their initial position. By the vertical arrangement of the movable knives it is desired to obtain a vertical cut and to prevent the mass from sticking on the knives.

The latter machine certainly constitutes a considerable advance as regards output and efficiency, but it has not proved satisfactory in practice. The reason for this is to be attributed to the peculiarity of the cream caramel mass which is exceptionally sticky. If this mass is cut with knives which only move downwards and upwards, small particles of the mass remain adhering to the knives during the return movement. During the next cut more of the mass sticks to the knives, so that this machine becomes dirty after a very short time.

In order to avoid these objections a reciprocating movement in the transverse direction is according to the invention imparted to the upper chain in addition to the progressive movement. Further according to the invention the links of the lower chain are provided with spring actuated clamping jaws guided by guide bars. Moreover, at the reversing point of the lower chain, a wheel provided with controlled grippers is arranged, which takes the separated sweets off the lower chain and deposits them on a conveyor band arranged thereunder.

Figure 1:
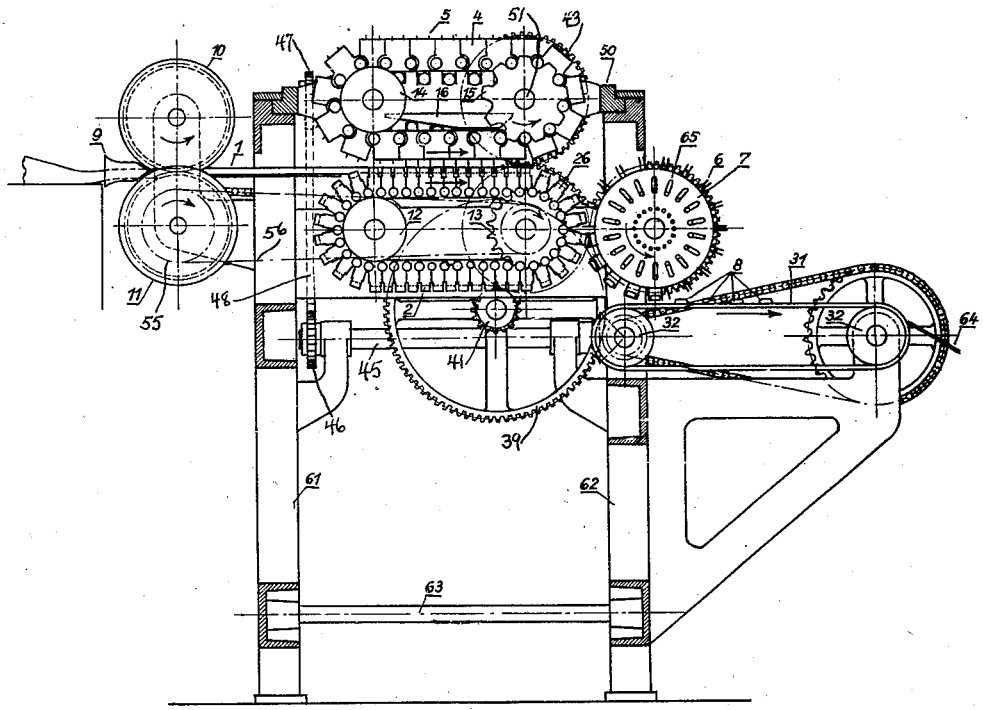
Figure 2:
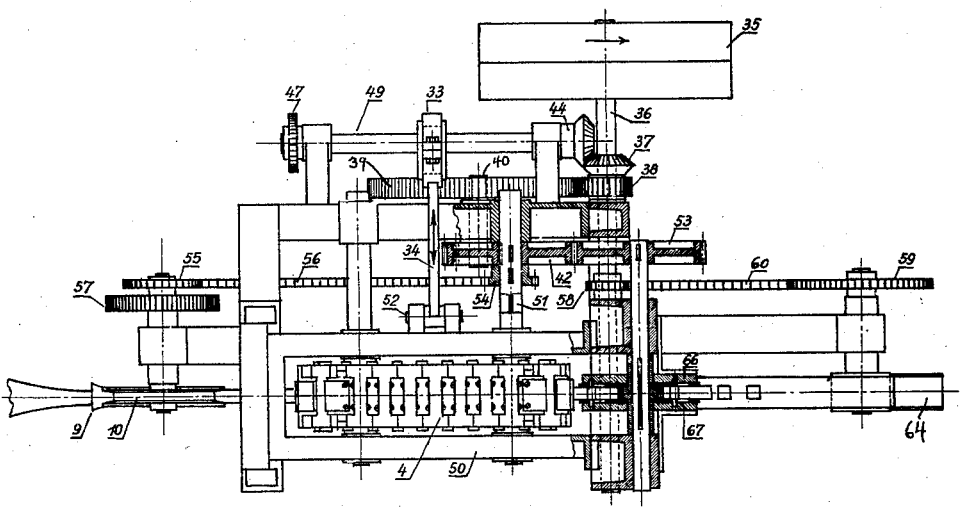
Figure 3:
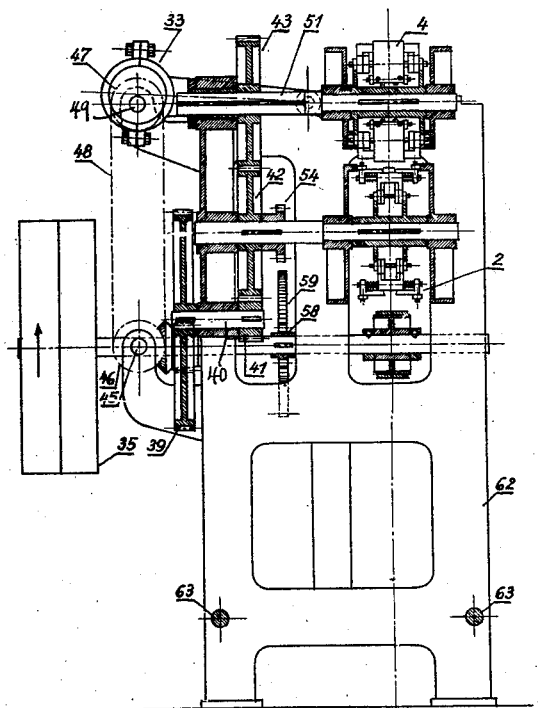
Figure 6:
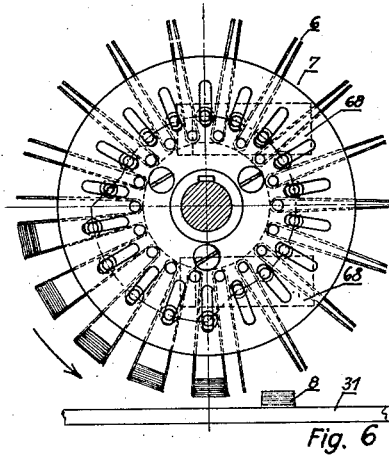
Figure 4:
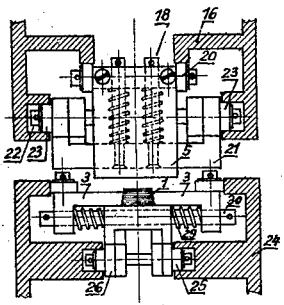
Figure 5:
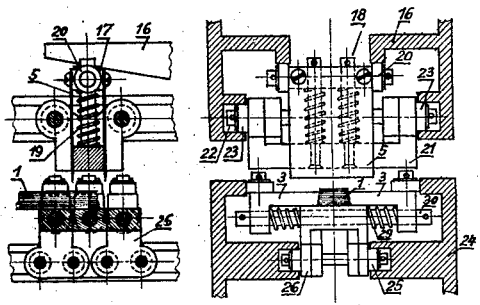
Figure 7:
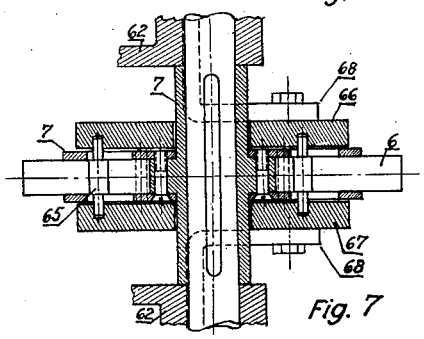

An embodiment of the invention is illustrated by way of example in the accompanying drawings in which:

Fig. 1 is a side elevation of the machine.
Fig. 2 is a top plan view of Fig. 1.
Fig. 3 is a front view of Fig. 1.
Fig. 4 shows a longitudinal section and
Fig. 5 a cross-section through the upper and lower chains at the commencement of the cutting operation.
Fig. 6 shows the gripping wheel in side elevation.
Fig. 7 is a cross-section of Fig. 6.

The strip of mass is fed in known manner through a feed pipe 9 to a pair of rolls 10 and 11, which shape the string into a band 1 of desired cross section. This mass band 1 is fed to the lower chain 2 supported by chain rollers 12 and 13, which chain holds and feeds forward the band with the aid of clamping jaws 3. The chain links 26 of the lower chain 2 are provided with guide rollers 25, which run in guide bars 24. The clamping jaws 3 are guided on bolts 30 and acted upon by helical springs 29, which press the clamping jaws 3 against the guide bars 24. Above the lower chain 2 an upper chain 4 is arranged running at the same speed as the lower chain 2 and supported by chain rollers 14, 15, said upper chain 4 carrying out, besides the progressive movement, at the same time a reciprocating movement in transverse direction produced by a cam 33 and connecting rod 34. The upper chain 4 is fitted in known manner with vertically shiftable cutting knives 5 fixed on guide bars 17 which are moved with the aid of curved bars 16. The guide bars 17 are guided on bolts 18 fitted on the links 21 of the upper chain 4, and provided with rollers 20 which are pressed by the action of springs 19 against the curved bars 16. The chain links 21 are provided with guide rollers 23, which run in guides 22. The drive of the machine is effected by belt pulleys 35. A bevel wheel 37 and a spur wheel 38 are keyed on the driving shaft 36. The spur wheel 38 transmits its rotation to the shaft 40 by means of a spur wheel 39. On the shaft 40 a spur wheel 41 is keyed, which moves forward, the upper chain 4 and lower chain 2 through spur wheels 43 and 42. A shaft 45 is rotated by the bevel wheel 37 and a bevel 44, and the movement of shaft 45 is transmitted to shaft 49 by sprocket wheels 46, 47 and a chain 48. The cam 33 is keyed on the shaft 49 and imparts a reciprocating movement to the chain housing 50 through the cam rod 34. The upper chain 4 is stretched over the chain rollers 14 and 15 in the chain housing 50. The drive of the chain rollers 15 is effected by a square shaft 51 from the spur wheel 43. The square shaft 51 therefore performs a reciprocating movement in the square bore of the spur wheel 43 in addition to the rotary movement. A bolt 52 connects the cam rod 34 to the chain housing 50. The drive of the wheel 7 is transmitted from the spur wheel 42 onto a spur wheel 53. The drive of the rollers 10 and 11 is transmitted through sprocket wheels 54, 55 and chain 56 onto spur wheels 57. The drive of the conveyor band 31 is effected from the driving shaft 36 through sprocket wheels 58, 59 and chain 60. 61 and 62 are the walls of the frame, 63 connecting rods, 64 is a discharge plate, 65 are bolts which open and close the grippers 6 by their radial displacement. 66 and 67 are stationary cams which serve for controlling the bolts 65. The cams 66 and 67 are fixed on the wall 62 by four angle brackets 68.

The band of mass gripped by the lower chain 2 is cut into pieces during its forward movement by means of the reciprocating cutting knives 5, which are gradually pressed downwards by the curved bars 16. The knives are then moved vertically upwards by the pressure of the springs 19, so that the cut pieces of mass lie freely on the lower chain 2, being only held by the clamping jaws 3. As soon as the chain links bear on the pitch circle circumference of the chain roller 13 of the lower chain 2, the chain links move apart, and the still existing adhesion of the individual pieces of mass is loosened. A wheel 7 with grippers 6 is fitted at the reversing point of the lower chain 2. The grippers 6 enter the gaps formed between the spread chain links and grip the pieces of mass 8. At the same time the clamping jaws 3 arranged on the lower chain 2 disengage and release the pieces of mass 8. During the further rotation of the wheel 7 the pieces of mass 8 are deposited through the disengagement of the grippers 6 onto the conveyor band 31 with conveyor shafts 32 situated thereunder.

I claim:—

1. A machine for making cream caramels and similar caramels, comprising in combination a lower chain adapted to serve as conveyor band for the sugar mass fed thereto in the shape of a calibrated band, an upper chain arranged above and rotating at the same speed as said lower chain, means for imparting to said upper chain a reciprocating movement in transverse direction during its rotating movement, vertically shiftable knives on said upper chain, and stops adapted to shift said knives.

2. A machine as specified in claim 1, comprising in combination with the lower chain, composed of links, clamping jaws on said links, springs acting on said jaws, and guide bars adapted to guide said jaws.

3. A machine as specified in claim 1, comprising in combination with the lower chain, a wheel provided at the reversing point of said chain, controlled grippers on said wheel adapted to take the severed pieces from said lower chain, and a conveyor band arranged under said wheel adapted to receive the severed pieces removed from said lower chain by said grippers.

In testimony whereof I affix my signature.

MAX PÖNISCH.